United States Patent [19]

Budzich

[11] 4,139,987
[45] Feb. 20, 1979

[54] LOAD RESPONSIVE SYSTEM PUMP CONTROLS

[76] Inventor: Tadeusz Budzich, 80 Murwood Dr., Moreland Hills, Ohio 44022

[21] Appl. No.: 835,999

[22] Filed: Sep. 23, 1977

Related U.S. Application Data

[63] Continuation-in-part of Ser. No. 756,618, Jan. 4, 1977, Pat. No. 4,074,529.

[51] Int. Cl.² ............................................. F16H 39/46
[52] U.S. Cl. ........................................ 60/445; 60/451; 60/452; 60/484; 60/DIG. 2
[58] Field of Search ................. 60/391, 445, 451, 452, 60/468, 478, 484, DIG. 2; 244/175; 417/212

[56] References Cited

U.S. PATENT DOCUMENTS

| | | | |
|---|---|---|---|
| 3,444,689 | 5/1969 | Budzich | 60/427 |
| 3,455,210 | 7/1969 | Allen | 91/446 |
| 3,470,694 | 10/1969 | Budzich | 60/427 |
| 3,744,243 | 7/1973 | Faisandier | 60/452 |
| 3,858,393 | 1/1975 | Budzich | 60/484 X |
| 3,890,783 | 6/1975 | Allen et al. | 60/484 |
| 3,984,979 | 10/1976 | Budzich | 60/445 |

*Primary Examiner*—Edgar W. Geoghegan

[57] ABSTRACT

A load responsive fluid power control system using servo type flow control valves and fluid motors supplied by a variable displacement pump. The pump displacement is regulated by an electro-hydraulic control valve in response to an electrical signal proportional to motor load or motor load pressure to vary the pump displacement to maintain a controlled constant or variable pressure differential between the pump outlet pressure and motor load pressure or to vary the pressure differential between pump outlet pressure and motor load pressure in response to a signal from a computing device. The pump control also limits maximum and minimum system pressures.

35 Claims, 3 Drawing Figures

LOAD RESPONSIVE SYSTEM PUMP CONTROLS

This is a continuation in part of application Ser. No. 756,618, filed Jan. 4, 1977 now U.S. Pat. No. 4,074,529 issued Feb. 21, 1978 for "Load Responsive System Pump Controls."

BACKGROUND OF THE INVENTION

This invention relates generally to a load responsive fluid power system using a servo valve in control of a fluid motor driving a load and operated by a variable displacement pump.

In more particular aspects this invention relates to a load responsive fluid power system in which the pump displacement control is regulated in response to a load pressure signal supplied from a fluid motor.

In still more particular aspects this invention relates to an electro-hydraulic variable displacement pump control which automatically regulates the outlet flow of the pump to maintain a controlled constant or variable pressure differential between the pump outlet pressure and servo valve controlled motor load pressure in response to an electrical signal proportional to motor load or motor load pressure or to vary the pressure differential between pump outlet pressure and motor load pressure in response to a signal from a computing device.

In still more particular aspects this invention relates to a multiple load system in which the pump control responds to highest system load.

Load responsive fluid power and control systems are very desirable for a number of reasons. They permit load control with reduced power losses and therefore, increased system efficiency and when controlling one load at a time provide a feature of flow control, irrespective of variation in the magnitude of the load. Normally such valves transmit load control signals to the pump control, which automatically maintains pump discharge pressure at a level higher, by a constant pressure differential, than the pressure required to sustain the load. A variable orifice introduced between pump and load varies the flow supplied to the load, each orifice area corresponding to a different flow level, which is maintained constant irrespective of variation in magnitude of the load. Load responsive valves for such a system are disclosed in my U.S. Pat. Nos. 3,470,694 dated Oct. 7, 1969 and also in 3,455,210 issued to Allen on July 15, 1969. Load responsive variable displacement pump control for such a system is disclosed in my U.S. Pat. No. 3,444,689 dated May 20, 1969. The universal application of such a system is, however, limited by several basic system disadvantages.

Since this system, to maintain flow characteristics of system valves and to retain high system efficiency, works with a comparatively low constant pressure differential between the pump outlet pressure and the load pressure, the use of the conventional servo type valves in such a system becomes impossible. A servo valve, well known in the art, takes a low energy input and translates it into high energy hydraulic output. Feedback, well known in the art, keeps the hydraulic output of flow or pressure proportional to input signal. It is generally accepted that a servo valve can deliver maximum power to the load when the load differential pressure equals two thirds of the supply pressure. Therefore, neglecting other losses, one third of the system pressure drop occurs across the servo valve. This optimum pressure drop can be influenced by matching servo valve size to the load, but increasing servo valve size increases weight and cost of the system. If the servo valve is too small, the system may become velocity limited during its duty cycle and have poor dynamic response. When the system operates under this condition, a large portion of the pressure drop occurs across the servo valve instead of across the actuator connected to the load, and little useful work is done. The power expended in the servo valve heats the working fluid excessively which is undesirable and inefficient. Normally servo valves are used in a constant pressure system, the controlled system pressure being dictated by the most adverse combination of load requirements, which must be satisfied, but which in the average system occur only during a very small percentage of the time and usually do not occur in the normal duty cycle. Therefore due to their basic characteristics servo valves, almost without exception, are used in constant pressure systems, which are supplied by variable displacement pumps controlled by conventional pressure compensator controls, which automatically vary the displacement of the pump to maintain a constant system pressure. The constant pressure level of the system as previously mentioned is determined by the size of the servo valve and most adverse combination of load requirements. In consequence the servo valve uses constant maximum pressure in control of a variable load, most of the fluid power energy being converted by throttling into heat, which not only represents system inefficiency, but introduces additional parasitic effects, well known to those skilled in the art. High pressure drops across servo valve when controlling small loads with high system pressure produce many other adverse effects, like change in the gain of the system, high flow forces acting on the valve spools and possible system instability.

SUMMARY OF THE INVENTION

It is therefore a principal object of this invention to provide a load responsive fluid control system, in which an electrical control signal, proportional to magnitude of the load being controlled by a fluid valve, is supplied to the variable displacement pump electro-hydraulic control, to vary system pressure, to control a constant or variable pressure differential between the pump outlet pressure and the pressure necessary to sustain the system load.

Another object of this invention is to control the pressure differential between pump outlet pressure and pressure necessary to sustain a load, controlled by servo valve in response to a signal from a computing device and vary the system pressure in respect to load pressure for optimum operation and response of the servo valve, while limiting pressure drop across the servo valve and increasing system efficiency.

It is another object of this invention, in a system in which multiple loads are being controlled by multiple servo valves, to individually control the best pressure differential between the pump outlet pressure and pressure necessary to sustain the system load, for each individual servo valve and load system.

It is a further object of this invention, in a system in which multiple loads are being controlled by multiple servo valves, to transmit only the highest of all the electrical load signals, transmitted from all of the system loads, the pump control maintaining a controlled pressure differential between the system pressure and the pressure necessary to sustain the highest system load.

It is a further object of this invention, in a system in which multiple loads are being controlled by servo valves and load responsive direction control valves, to control the pressure differential between the load pressure and the pressure equivalent to the electrical load pressure signal of each individual load, the highest electrical load pressure signal with its controlled differential being transmitted to the electro-hydraulic control of the pump.

It is a further object of this invention to provide the pump control with a feature which automatically limits the maximum and minimum system pressure to fixed predetermined values.

Briefly the foregoing and other additional objects and advantages of this invention are accomplished by providing a novel load responsive fluid control system for use during control of multiple loads by servo valves and load responsive direction control valves. A system pump pressure is controlled in respect to highest electrical load pressure signal, transmitted from system servo valves, to maintain system pressure higher, by a controlled pressure differential than pressure necessary to support the highest system load controlled by a servo valve. This controlled pressure differential may either be constant or can be made variable in response to a signal from a computing device for optimum operation and response of the servo valve, while limiting pressure drop across the servo valve and increasing system efficiency. Pump control automatically limits the maximum system pressure and also limits the minimum system pressure to a level as dictated by, for example, the system stiffness and response characteristics of the system servo valves.

Additional objects of this invention will become apparent when referring to the preferred embodiments of the invention as shown in the accompanying drawings and described in the following detailed description.

DESCRIPTION OF THE PREFERRED EMBODIMENTS

Figure 1:
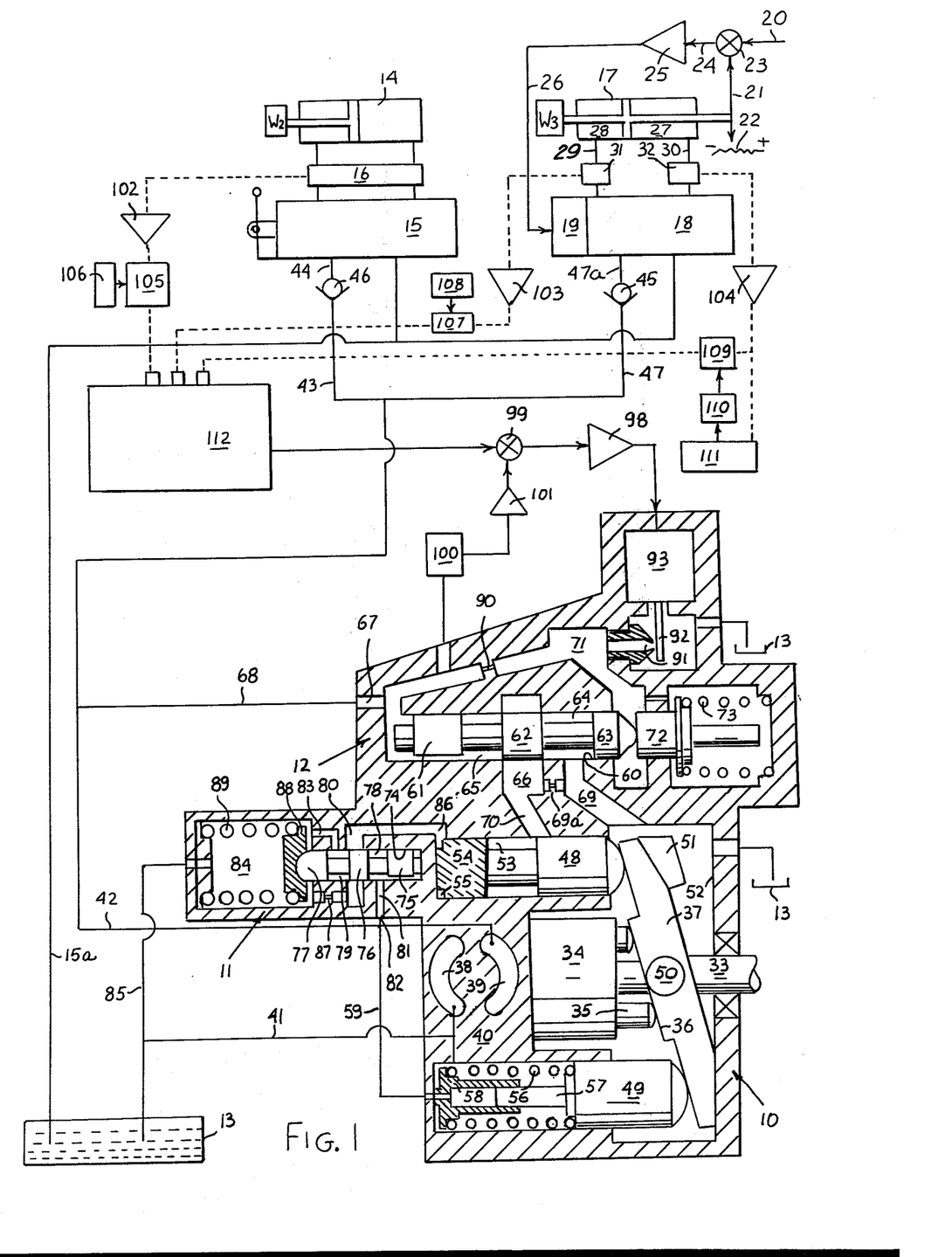
FIG. 1 is a schematic circuit diagram of a multiple load system using servo valves and load responsive direction control valves with pump control responding to the highest system load, while the load signals are transmitted electrically.

Referring now to the drawings and for the present to FIG. 1 an embodiment of diagramatically shown variable displacement pump, generally designated as 10 and its controls, generally designated as 11 and 12, is interposed between a system reservoir 13 and system motors controlled by system valves. The variable displacement pump 10 may be of an axial piston type, as shown in FIG. 1, or radial piston type, or vane type, or any other type in which the volume of fluid output per one revolution of the pump can be regulated. Although in the preferred embodiments the system pump is shown as a variable displacement type, a fixed displacement pump, with output flow control of a bypass type, well known in the art, could be used, the pump bypass mechanism being then operated by the pump controls instead of by the variable displacement mechanism of a variable displacement pump.

Fluid motor 14, operating load $W_2$ is controlled by load responsive flow control valve 15, which can be manually operated. Load responsive flow control valves may be of a type, as disclosed in my U.S. Pat. Nos. 3,470,694 dated Oct. 7, 1969 and also in my 3,984,979 dated Oct. 12, 1976, or any other type which provides load pressure signal to the pump controls. Such valves usually when actuated connect first motor pressure with the pump controls, before connecting the motor with pump and reservoir channels. Electrical signal proportional to actuator differential pressure is generated by differential pressure transducer 16 and supplied to the electrical network of system controls. Load responsive valve 15 usually contains controls which provide fluid flow to the motor, proportional to the valve spool displacement from its neutral position and independent of system pressure. A fluid motor 17, operating a load $W_3$, is controlled by an electro-hydraulic servo valve 18, controlled by a torque motor 19, well known in the art. Load responsive valve 15 and servo valve 18 are connected to reservoir 13 by exhaust line 15a. In a well known manner an electrical command signal 20 and a position feedback signal 21 from a position transducer 22 are subtracted from each other in a differential 23, producing a position error signal 24, which is supplied to a servo amplifier 25, which supplies through line 26 position error signal current to the torque motor 19, thus closing the control loop. Load pressures from the motor chambers 27 and 28 are transmitted through lines 29 and 30 to pressure transducers 31 and 32. Electrical signals proportional to pressure in chambers 28 and 27 are generated by pressure transducers 31 and 32 and supplied to the electrical network of system controls. The variable displacement pump 10 is driven by a shaft 33, from a prime mover not shown, revolving a cylinder barrel 34, slidably guiding pistons 35, which abut against inclined surface 36 of a swash plate 37. Rotation of the cylinder barrel 34 will include a reciprocating motion in pistons 35 maintained against inclined surface 36, which will result in a fluid transfer from low pressure port 38 to high pressure port 39, of a diagramatically shown valve plate 40. Low pressure port 38 is connected through suction line 41 with the system reservoir 13. High pressure port 39 is connected through discharge line 42 and lines 43 and 44 with load responsive flow control valve 15 and through lines 47 and 47a with the servo valve 18. Load check valves 45 and 46 are positioned in high pressure lines 43 and 47 leading to valves 15 and 18 respectively, to prevent back flow of load pressure into the pump discharge circuit. The swash plate 37 of the variable displacement pump 10 is subjected to forces of a first actuating piston 48 and a second actuating piston 49 and pivots around a pin 50, regulating the output of high pressure fluid from the pump by change in the angle of inclination of the swash plate 37, in respect to the axis of rotation of the cylinder barrel 34. With a stop 51 engaging surface 52 the swash plate 37 assumes a vertical position corresponding to a zero pump discharge flow. The first actuating piston 48 is subjected to pressure in space 53 and to force developed on area of a transfer piston 54 by pressure in space 55 in a direction to decrease flow output from the pump. The second actuating piston 49 is subjected to the biasing force of a spring 56 and force developed on the cross-sectional area of piston 57 by pump discharge pressure transmitted to a reaction cylinder 58. The reaction cylinder 58 is connected with discharge line 42 by line 59.

The pump control 12 is provided with bore 60 axially guiding a pilot valve spool 61. The pilot valve spool 61, shown in FIG. 1 in a modulating position, has a metering land 62 and a land 63 defining annular spaces 64 and 65. Bore 60 is provided with annular space 66. Annular space 65 is connected through port 67 and line 68 with discharge line 42 and therefore is subjected to discharge pressure of the pump 10. Annular space 64 is connected through port 69 with the system reservoir 13. Leakage orifice 69a interconnects annular space 66 with port 69. Annular space 66 is connected through passage 70 with space 53. The land 63 with its spherical end projects into pressure chamber 71 and engages piston 72, subjected to biasing force of a load spring 73. Position of metering land 62 regulates pressure in annular space 66 and space 53 generating force on actuating piston 48 which rotates swash plate 37.

The pump control 11 is provided with bore 74 axially guiding a pilot valve spool 75. The pilot valve spool 75, shown in FIG. 1 in an unloading position, has a metering land 76 and a land 77 defining annular spaces 78 and 79. Bore 74 is provided with annular space 80. Annular space 78 is connected through port 81 and line 82 to discharge line 42 and therefore is subjected to discharge pressure of the pump 10. Annular space 79 is connected through passage 83 with space 84, which in turn is connected through line 85 to the system reservoir 13. Annular space 80 is connected through passage 86 with space 55 and through the leakage orifice 87 to space 84. The land 77 with its spherical end projects into space 84 and engages the spring retainer 88, subjected to biasing force of a maximum pressure spring 89.

The variable displacement pump 10, in a well known manner, by changing the angular inclination of the swash plate 37 will proportionally regulate the flow of fluid from low pressure port 38 to high pressure port 39. Low pressure port 38 is connected by suction line 41 to the reservoir 13. High pressure discharge fluid is supplied from high pressure port 39 through discharge line 42 to the fluid power and control system as shown in FIG. 1. The swash plate 37 is biased towards position of its maximum angular inclination and therefore towards position of maximum flow output of the variable displacement pump 10 by the second actuating piston 49, which is subjected to force of the spring 56 and force developed on cross-sectional area of piston 57, by the pressure existing in discharge line 42. The swash plate 37 is biased towards the position of its minimum angular inclination and therefore towards position of minimum flow output of the variable displacement pump 10 by the first actuating piston 48. The first actuating piston 48 is subjected to force developed on its cross-sectional area by pressure in space 53, or through the action of the transfer piston 54 to the force developed on its cross-sectional area by pressure in space 55. In a well known manner the force generated by the higher of the two pressures, existing in spaces 53 and 55, will be transmitted by the first actuating piston 48 to the swash plate 37. Therefore by regulating the pressure level in spaces 53 and 55, the angular inclination of the swash plate 37 and therefore the discharge flow of the variable displacement pump 10 can be controlled. Since the pressure level in space 53 is dictated by the pump control 12 and the pressure level in space 55 is dictated by the pump control 11, displacement and output flow of the variable displacement pump 10 can be varied in response to the control pressure transmitted either from the pump control 12 or the pump control 11.

The pump control 11 limits through the control of the angle of inclination of the swash plate 37 the maximum system pressure to a fixed predetermined level and represents a type of control well known in the art as pressure compensator. Assume that the pressure in space 53 is maintained by the pump control 12 at a low level. The pilot valve spool 75, of the pump control 11, is subjected to the force generated by pressure in annular space 78, acting on its cross-sectional area, tending to move it from right to left and the biasing force of the maximum pressure spring 89 tending to move it from left to right. Since annular space 78 is directly connected through port 81 with the pump discharge pressure and since space 84 containing the maximum pressure spring 89 is maintained through line 85 at reservoir pressure, the force generated by the pump discharge pressure on the cross-sectional area of the pilot valve spool 75 will overcome the preload in the maximum pressure spring 89 and move the pilot valve spool 75 from right to left. The preload in the maximum pressure spring 89 is so selected that it corresponds to the maximum system pressure to which the system can be subjected. As shown in FIG. 1 the pilot valve spool 75 is maintained by the maximum pressure spring 89 in its extreme position to the right, connecting space 55 through passage 86, annular space 80, annular space 79, passage 83, space 84 and line 85 with the system reservoir 13. Therefore the swash plate 37 will remain biased by the second actuating piston 49 at its maximum angular inclination, the variable displacement pump 10 delivering maximum flow to the system. Assume that the pump discharge pressure will increase gradually until it will reach a level, at which, acting on the cross-sectional area of the pilot valve spool 75 it will move the pilot valve spool 75 from right to left against the biasing force of the maximum pressure spring 89, first closing with the metering land 76 communication between annular space 79 and annular space 80 and then gradually connecting annular space 80 with annular space 78, which is subjected to the discharge pressure of the variable displacement pump 10. The pressure in annular space 80, passage 86 and space 55 will increase to a level at which, acting on the cross-sectional area of the transfer piston 54, it will move the transfer piston 54 and the first actuating piston 48 against the force, developed by the second actuating piston 49, reducing the angular inclination of the swash plate 37 and discharge flow of the variable displacement pump 10, to a level, at which the discharge pressure will begin to drop. The pilot valve spool 75 will move from left to right into a modulating position, in which the metering land 76, in a well known manner, will vary the pressure in space 55, to vary the angular inclination of the swash plate 37, to vary the discharge flow of the variable displacement pump 10, to maintain the maximum discharge pressure of the pump 10 at a constant level, as dictated by the preload in the maximum pressure spring 89. Since a small leakage flow, proportional to pressure in space 55, is induced by the leakage orifice 87 between annular space 80 and space 84, the metering land 76 will assume a modulating position, throttling fluid flow from annular space 78 to annular space 80 and space 55, to vary the flow of the variable displacement pump 10, to maintain the system pressure at a constant maximum pressure level. The leakage orifice 87 is usually introduced to increase control stability. In the intermediate pump discharge pressure range of the variable displacement pump 10, lower than the maximum system pressure, as determined by the preload in the maximum pressure spring 89, the pump control 11 is completely inactive, maintaining the pressure in space 55 at reservoir pressure, permitting operation of the pump control 12. Once, however, the system pressure, as dictated by the pump control 12, will reach the maximum pressure control setting of the pump control 11, the pump control 11 automatically takes over, varying the displacement of the variable displacement pump 10, to maintain system pressure at this maximum level, until the pump control 12 will lower the system pressure to a level, below pressure setting of the pump control 11, at which time the pump control 11 becomes inactive and system pressure is controlled by the pump control 12.

Figure 2:
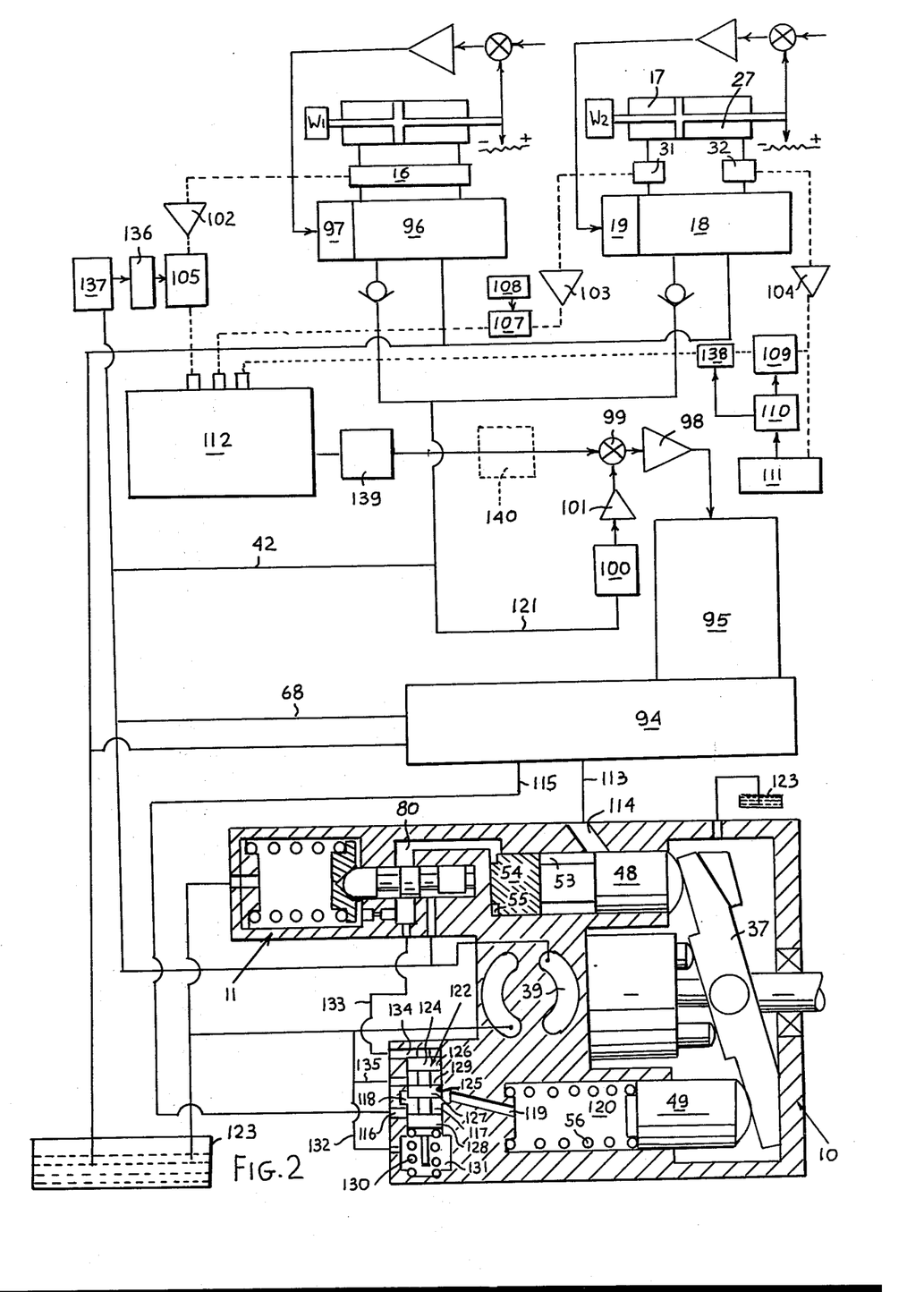
FIG. 2 is a schematic circuit diagram of another embodiment of a multiple load system using servo valves in control of loads and a servo valve in control of pump displacement responding to the highest system load, while the load signals are transmitted electrically.

Pump control 12 is a variation of an electro-hydraulic servo valve, well known in the art, which takes a low energy electrical input and translates it into high energy hydraulic output. Some early designs used an electric torque motor armature, directly connected to a spool of a hydraulic valve and supplied all the power to move it. Such a valve is called a single stage valve in contrast to later developments, which added a second stage of hydraulic amplification, or socalled pilot operation. Various designs can be used for the second stage. Cascading a larger second stage spool valve with the first stage of amplification gives higher power levels. Feedback, well known in the art, keeps output flow or pressure proportional to input signal. A two stage servo valve development, that gained wide acceptance, is the combination of first stage using a nozzle-flapper combination, as a hydraulic amplifier and a spool output stage. An electrical input signal into the torque motor produces a proportional output pressure from the first stage hydraulic amplifier. This pressure is used to drive the output spool. Such a first stage hydraulic amplifier is used in the servo pump control 12. The first stage has a fixed upstream orifice 90 connected through port 67 and lines 68 and 42 to the high pressure port 39 of the variable displacement pump 10 which provides the source of pressure and a nozzle type down stream orifice 91, resistance of which is varied by position of a flapper 92 in relation to the nozzle orifice 91. The flapper 92 is operated by a torque motor 93 which usually consists of a polarized solenoid energized by a coil. The pressure in chamber 71, positioned between the upstream orifice 90 and the nozzle orifice 91, which are in series, is applied to one end of the pilot valve spool 61. The servo valve can have a single nozzle-flapper hydraulic amplifier of an unbalanced type, in which first stage pressure is ported to one end of the output spool. Such a servo valve is shown in FIG. 1, operating through the pilot valve spool 61 the flow changing mechanism or the swash plate 37 of the variable displacement pump 10. Double nozzle balanced type servo valves have two sets of opposing orifices and nozzles and transmit first stage amplified pressure signal to both ends of the output spool. In FIG. 2 a servo valve 94 of such a type, operated by a torque motor 95, can be used to control flow of variable displacement pump 10. Similar type servo valves 96 and 18 operated by torque motors 97 and 19 of FIGS. 1 and 2 can be used in closed loop system controlling loads W.

The pilot valve 61 is subjected on one side of the pressure developed in chamber 71 and to biasing force of the spring 73, transmitted through a piston 72. With pressure in chamber 71 at a very low level, corresponding to a very low control signal to torque motor 93, the pilot valve spool 61, biased by the spring 73, will perform as a conventional pressure compensator control, automatically maintaining constant preselectable minimum pressure in chamber 71 and therefore in pump discharge port 39, by varying the displacement of the variable displacement pump 10. This minimum pressure level is dictated by preload in spring 73. Rising pressure in chamber 71 will react on cross-sectional area of the pilot valve spool 61, tending to increase the system pressure. A further increase in the pressure in chamber 71, in a manner as previously described, will automatically increase, by an equal amount, the discharge pressure level of the variable displacement pump 10, by regulating output flow of the pump.

The control signal from the electrical network is supplied to servo amplifier 98. Servo amplifier, well known in the art, usually includes a command and feedback signal differential 99, feeding an error signal, which is equal to the difference between command and feedback signals, into forward path amplifier, which provides torque motor control current to the torque motor 93. Feedback pressure signal of pump discharge pressure, sensed by the pressure transducer 100 and amplified by the signal amplifier 101, is supplied to the differential 99. Therefore in a well known manner control signal, proportional to the difference between signal transmitted from electrical network and feedback signal, which constitutes an error signal, is supplied from the servo amplifier 98 to the torque motor 93. In a manner as previously described the flapper 92 will vary pressure in chamber 71, in respect to the error signal supplied from the servo amplifier 98. Therefore pump control 12 will automatically vary the flow of variable displacement pump 10 to maintain its discharge pressure at a level as dictated by the control signal transmitted from the electrical network to the servo amplifier 98.

Pressure transducer, well known in the art, is a device which converts pressure signal into a proportional electrical signal, usually providing an output voltage proportional to system pressure. Such transducers 32, 31 and 100 are shown in FIG. 1. Pressure transducers use many types of transducing elements, strain gauge being one of them and can provide not only a signal proportional to direct pressure, but also a signal proportional to differential pressure. Differential pressure transducer, providing a signal proportional to differential pressure across an actuator, will also provide a signal, which is proportional to system load, being operated by the actuator. Such a transducer 16 is shown in FIG. 1. Load signal can also be obtained, as is well known in the art, by a load cell, which directly reacts to the loads developed by the actuator.

An electrical signal, proportional to system load or pressure, is supplied to signal amplifiers 102, 103 and 104. Signal amplifiers are instrument type of operational amplifiers, well known in the art, which amplify a relatively weak electrical control signal, by a fixed preselectable ratio, into a proportional higher strength signal. Low strength electrical control signal is usually in the form of variable voltage. These amplifiers, at different preselectable ratios of amplification, amplify electrical signals, proportional to load or pressure, from different types of pressure or load transducers.

Electrical signal, in form of voltage proportional to differential pressure, is transmitted through signal amplifier 102 to a summing network 105. The electrical circuits, which perform the summation of two or more voltages, can be implemented by a number of methods. Discrete elements resistors, capacitors, transistors etc. can be used. The use of summation amplifiers in circuits, which perform mathematical operations such as addition is well known. Therefore summing network, composed of components well known in the art, can continuously add constant or variable voltage to the variable output signal, supplied from the pressure transducer. Source of such a constant voltage 106 is supplied to the summing network 105 and is continuously added to the variable output signal from signal amplifier 102. Therefore signal delivered from the summing network 105 is proportional to the differential pressure developed across the actuator 14, plus a constant preselectable pressure differential, equivalent to the signal delivered from the source of constant voltage 106. Such a signal, when transmitted to the pump control 12, would maintain the discharge pressure of the pump 10 at a level higher, by a constant pressure differential, than the pressure level required to sustain the load $W_2$. A load responsive valve 15, in a well known manner, will then provide a controlled rate of flow, proportional to displacement of its spool from neutral position, to actuator 14, each position of the spool representing a constant rate of flow, irrespective of the variation in the load $W_2$.

The electrical control signal from the transducer 31 is transmitted through the signal amplifier 103 to a summing network 107, which is supplied with a signal from the source of constant voltage 108. Output signal from summing network 107, when transmitted to the pump control 12, in a manner as previously described when referring to summing network 105, will maintain the output pressure of variable pump 10 at a level higher, by a constant pressure differential, than a pressure developed in motor chamber 28. This pressure differential will be proportional to the signal supplied from the source of constant voltage 108 and it will be selected at a level higher than that delivered from the source of constant voltage 106, since servo valve 18 must operate at a much higher pressure differential than the load responsive valve 15.

In a similar manner the electrical control signal from transducer 32, passed through signal amplifier 104, is delivered to summing network 109, which receives a signal from a source of variable voltage 110, the voltage level of which is varied by a signal from a computing device 111. Therefore, in a manner as previously described, the discharge pressure of the pump 10 will be maintained, higher by a variable pressure differential, the level of the pressure differential being dictated by the signal from the computing device 111. Therefore the pressure differential between the load pressure and the pressure supplied to the servo valve 18 and therefore the gain and the response of the servo valve 18 can be varied in response to a signal from a computing device, which might be for example a signal from a central computer of an aircraft flight control system.

The electrical signals from summing networks 105, 107 and 109 are transmitted to logic circuit 112, or logic comparitor system, which by using signal comparitors and gates, well known in the art, compares the strength of all incoming command signals and permits only the highest of those signals to pass through. Such a logic circuit could be assembled from many types of components, well known in the art and can be made to operate with weak command signals, in micro-volt range, or with higher strength or amplified signals. The highest amplified signal from the logic circuit 112 is supplied to a servo amplifier 98. Therefore the fluid power and electrical control system of FIG. 1 will maintain a discharge pressure from the variable displacement pump 10 at a level higher, by a certain pressure differential, than the highest load pressure, developed by any of the system loads. The level of this pressure differential, in a manner as previously described, is determined by the signals supplied from the source of constant voltage 106 and 108 and the source of variable voltage 110.

Referring now to FIG. 2, in a manner as previously described when referring to FIG. 1, the servo valve 94 may be of a double nozzle balanced type, well known in the art, having two sets of opposing orifices and nozzles and transmitting first stage amplified pressure signal to both ends of the output spool. The higher energy hydraulic output from the output spool is transmitted through line 113 and port 114 to space 53, where it reacts on the cross-sectional area of the first actuating piston 48. The high energy hydraulic output is also supplied from the output spool and transmitted through line 115, port 116, annular spaces 117 and 118 and passage 119 to space 120, where it reacts against cross-sectional area of the second actuating piston 49. The first stage of the servo valve 94 is operated, in a manner as previously described, by the torque motor 95, responsive to the error signal from the servo amplifier 98. In a manner as previously described the highest signal is transmitted from the logic circuit 112 to the differential 99, which normally is part of the servo amplifier 98. The differential 99 is also supplied with a feedback signal from system discharge pressure. The feedback signal from the transducer 100, connected through line 121 and line 42 to the high pressure port 39 of the variable displacement pump 10, is supplied to the signal amplifier 101 and the differential 99. The differential 99, in a well known manner, transmits the error signal to the servo amplifier 98.

The variable displacement pump 10 is essentially the same as that in FIG. 1, the only difference being the elimination of the piston 57 and the reaction cylinder 58 from the space 120, while the biasing spring 56 supplies a biasing force to the second actuating piston 49. The variable displacement pump 10 is also provided with an unloading valve, generally designated as 122. The pump control 11, limiting the maximum system pressure, is identical to that of FIG. 1 and performs in an identical way. In the intermediate pressure range, below the maximum system pressure, in a manner as previously described when referring to FIG. 1, the pump control 11 maintains annular space 80 and space 55 at the pressure of a closed system reservoir 123, which may be of a boot strap type, well known in the art and maintains the reservoir pressure at a level, higher than atmospheric presure. The unloading valve 122 is provided with a spool 124, guided in a bore 125. The spool 124 has lands 126, 127 and 128, defining annular spaces 117 and 129. Bore 125 is provided with annular space 118. The spool 124 is biased by a spring 130, positioned in space 131, which communicates through line 132 with the system reservoir 123. Annular space 80 of pump control 11 is connected by line 133 with control space 134. In a manner as previously described, during normal operation of the pump control in its intermediate zone of discharge pressure, the servo valve 94 is directly connected through port 116, annular spaces 117 and 118 and passage 119 to space 120. This line of communication is maintained open by spool 124 of unloading valve 122, biased by the spring 130. However, once the maximum discharge pressure of the system is reached, the pump control 11 will increase the pressure in annular space 80 and space 55. This increased pressure, transmitted through line 133 to control space 134, will move the spool 124 downwards, against the bias of the spring 130, with land 127 cutting off the servo valve 94 from space 120 and connecting space 120, through annular space 129 and line 135, to the system reservoir 123. The spring 56, through the second actuating piston 49, will tend to increase displacement of the variable displacement pump 10, while the pump control 11, in a manner as previously described when referring to FIG. 1, will regulate the displacement of the pump, to maintain the maximum system pressure at its preselected constant level. The operation of the pump control 11, while the load signals of the system demand pressure higher than the maximum system pressure, will not be affected by the servo valve 94 since, under these conditions, while responding to high load signal, the servo valve 94 will maintain the space 53 at a low pressure level and the high energy signal, transmitted from the servo valve 94 through lne 155 is blocked from space 120 by the spool 124 of the unloading valve 122.

The basic performance of a multiple load system using the servo valves of FIG. 2, is similar to that of FIG. 1. The pump control will automatically maintain the highest system pressure at a fixed predetermined level and will maintain a constant or variable pressure differential between the pump discharge pressure and the maximum pressure from the load $W_1$ or $W_2$, operated by the servo valves, as determined by the signals transmitted from the source of constant voltage 108 and sources of variable voltage 110 and 136. Summing network 105 is supplied by a signal from the source of variable voltage 136, which is responsive to a transformation device 137, connected to system pressure. Transformation device 137 transforms pump discharge pressure into a voltage, which is a function of system pressure, but not necessarily a linear function of system pressure.

In the signal line from transducer 32, passing through signal amplifier 104 and summing network 109, signal blocking device 138, responsive to signal from computing device 111, is introduced. In this way the computing device 111 can not only regulate the pressure differential between the pump discharge pressure and the pressure developed in the motor chamber 27, but while actuator 17 is inactive can block the actuator load pressure signal from influencing the pump discharge pressure. The signal blocking device 138 can be open to transmit the pressure signal by the computing device 111 in anticipation of the work to be performed by actuator 17 controlled by servo valve 18. This type of system permits substantial savings in energy and reduces the average operating pressures of the system. Those summing networks permit matching of the pressure differential between the pump discharge pressure and the load pressure, as required by the characteristics of any specific servo valve, or required characteristics of the system response, while conserving energy and reducing the heat input into the system's working fluid, thus providing better control characteristics and a more efficient system than conventional constant pressure system.

In FIG. 2 the control signal, transmitted from the logic circuit 112 is passed through a control device 139, containing an electronic network composed of components well known in the art, which supplies a constant minimum level control signal, equivalent to minimum selected system pressure, only when the variable control signal from the logic circuit 112 drops below this minimum control signal level. This minimum control signal, in a manner as previously described, will establish, through the existing control circuit of the variable displacement pump 10, minimum controlled pump discharge pressure, as required for the desired response of servo valves 96 and 18.

Control signal, delivered from the control device 139, may be passed through a control device 140, shown in dotted lines, which without appreciably modifying the control signal in a range, equivalent to the working pressure range of the variable displacement pump 10, will limit the control signal to maximum value, equivalent to pressure just below maximum system pressure, as determined by the setting of the pump control 11, which maintains the maximum system pressure level at a fixed predetermined value. The control device 140 may for example use a Zener diode, acting as a control element, to limit the maximum voltage of the control signal, or contain an electronic network of other components well known in the art. In a manner as previously described the control device 140 will establish, through the existing control circuit of the variable displacement pump 10, the maximum system working pressure, equivalent to maximum control signal as determined by the control device 140. Then the mechanical pump control 11 becomes an auxiliary overriding control, automatically limiting the the maximum system pressure and maintaining it at a constant predetermined level, protecting the system pump during malfunction of system controls and converting the system to a constant pressure system at the maximum system pressure level. The servo valve 94, as shown in FIG. 2, can be supplied through discharge line 42 with the discharge pressure of the variable displacement pump 10 or from a separate small pump, equipped with a constant pressure control and connected to reservoir 123.

Figure 3:
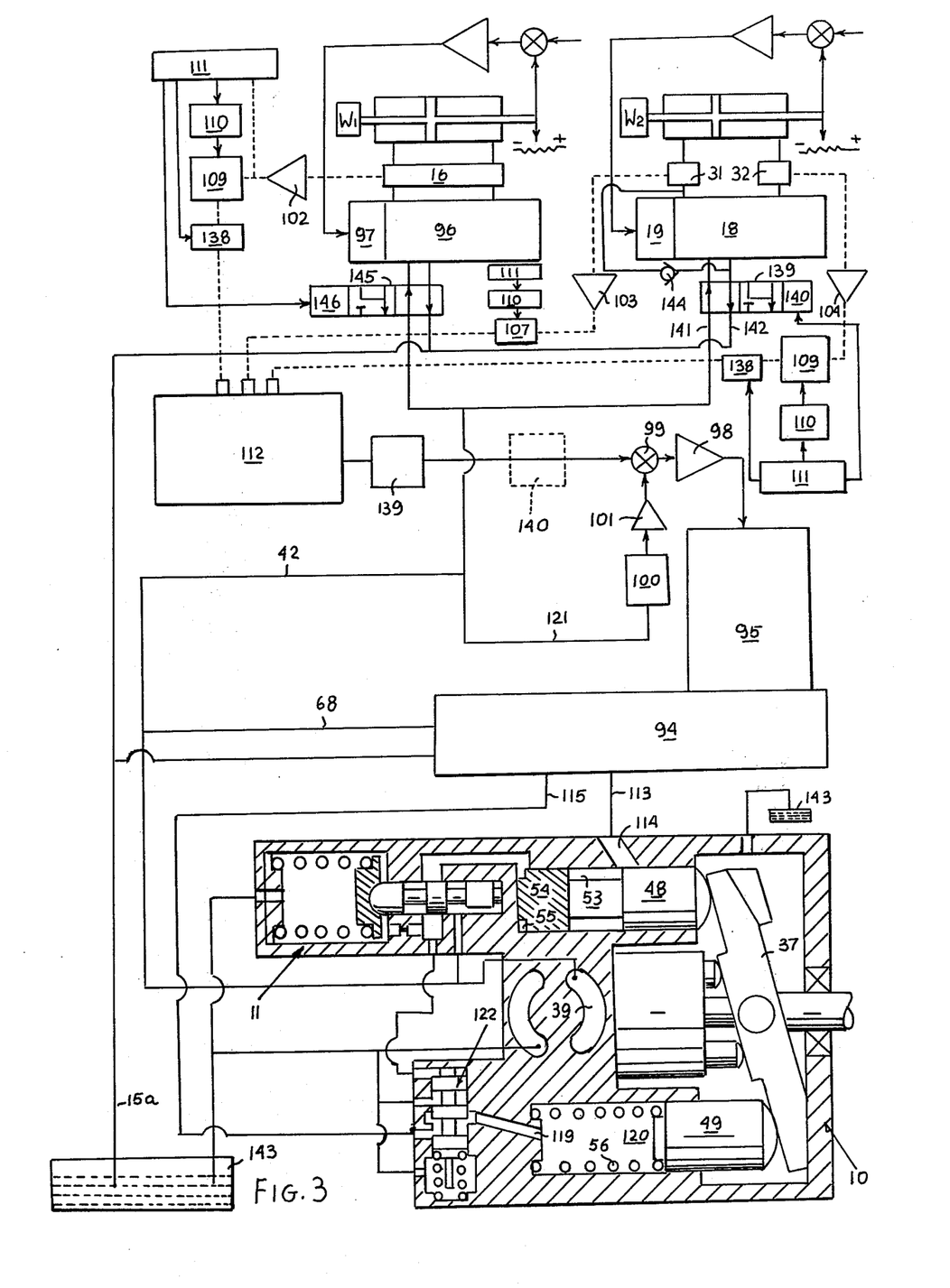
FIG. 3 is a schematic circuit diagram similar to FIG. 2 in which electrically controlled three way valves isolate the servo valves from the pump while connecting them to exhaust circuit during control of negative load.

Referring now to FIG. 3 another embodiment of a multiple load system employing servo valves and pump servo control of a double nozzle balanced type, as described when referring to FIG. 2 is used. The system of FIG. 3 uses the same variable displacement pump 10 and the same maximum pressure pump compensator control 11, as shown and described when referring to FIGS. 1 and 2. The system of FIG. 3 uses most of the same system control components as described when referring to FIG. 2. The summing network 109, the source of variable voltage 110, computing device 111 and signal blocking device 138, controlling the signal from transducer 32 to logic circuit 112, control device 139, control device 140 and the differential 99 are identical to those of FIG. 2. However electronically controlled three way valve 139, operated by a torque motor 140 in response to control signal transmitted from the computing device 111, is positioned in pump delivery line 141 and exhaust line 142 leading to pressurized system reservoir 143. In its normal operating position, as shown in FIG. 3, the three way valve 139, which can be of direct or servo control type, in the usual way connects the servo valve 18 with pump delivery circuit and the exhaust circuit. However when actuated by a signal from a computing device 111 the three way valve 139 cross-connects the inlet and outlet ports of servo valve 18, blocking the pump pressure circuit and connecting both ports of servo valve 18 with the exhaust circuit and system reservoir 143.

Assume that system reservoir 143 is maintained at a comparatively high pressure level, as dictated by the required response characteristics of servo valve 18. Assume also that the actuator $W_2$ is subjected to a high negative load pressure, as is the case with some of the actuators operating the flight control surfaces of a supercritical supersonic aircraft wing section, or in case of an excavator with the loaded bucket at rest in a raised position. A negative load is a load, energy of which is converted to heat by throttling of the outlet fluid flow from the actuator. Assume that computing device 111 will determine that the load $W_2$ will be moved in a direction in which it will realize its potential energy (negative load), which will be controlled by throttling in the servo valve 18 and it will also determine that the magnitude of the load $W_2$ is sufficiently high so that, when controlled by servo valve 18, it will follow the required velocity profile. Then the computing device 111, which can be the central computor of the flight control system, will actuate the three way valve 139 and the servo valve 18 will control the load $W_2$ by throttling outlet fluid flow from the actuator. The inlet fluid to the actuator is supplied from the actuators outlet flow and from reservoir 143 through the throttling orifice of the servo valve 18, the fluid pressure of the reservoir 143 being sufficiently high to supply the necessary pressure drop through the servo valve 18 and to maintain sufficient stiffness of the system to prevent flutter of the control surfaces. The inlet throttling orifice of the servo valve 18 may be bypassed in a well known manner by a check valve 144. Use of check valve 144 permits reduction in pressure in system reservoir 143 and is possible since the release of potential energy, equivalent to the negative load, is associated with one direction of travel of $W_2$. Since during the control of negative load the pressurized pump fluid is not used to provide the actuator inlet flow requirement, the throttling of the fluid by the servo valve 18 and resulting heat input into the fluid of the hydraulic system can be reduced by more than 50%, without affecting the system response. This method of controlling negative load and the associated gain in the system efficiency and the reduction of the heat input into the working fluid can be especially effective, when controling a system with large negative loads at high system pressure. Such is the case when controlling the flight surfaces during supersonic flight of a supercritical wing section which not only generates large negative loads but also due to small diameter of actuators, as dictated by the wing section, the system pressure levels are becoming very high.

The three way valve 145 controlled through torque motor 146 by a signal from the computing device 111 is basically identical to the three way valve 139 previously described and performs the same function in respect to operation of servo valve 96. The summing network 109 receives a variable voltage signal from the source of variable voltage 110 as dictated by the signal from the computing device 111. The use of variable pressure load responsive system with the feature of negative load bypass control can increase the system efficiency and reduce the heat input into the working fluid while at the same time providing an essentially constant gain system of improved stability without reduction of the average system response.

Although the preferred embodiments of this invention have been shown and described in detail it is recognized that the invention is not limited to the precise form and structure shown and various modifications and rearrangements as will occur to those skilled in the art upon full comprehension of this invention may be resorted to without departing from the scope of the invention as defined in the claims.

What is claimed is:

1. A fluid power and control system comprising a fluid pump, a fluid motor driving a load, and valve means interposed between said pump and said motor to control said load, flow changing means operable to vary fluid flow delivered from said pump to said fluid system to vary pressure in said fluid system, control signal generating means having means to generate an electrical control signal proportional to magnitude of said load, and control means responsive to said electrical control signal having means operable through said flow changing means to control a pressure differential between pressure of said fluid system and pressure necessary to support said load.

2. A fluid power and control system as set forth in claim 1 wherein said control signal generating means includes first transducer means having means to convert a mechanical force signal proportional to said load into a first proportional electrical signal.

3. A fluid power and control system as set forth in claim 1 wherein said control means has means to generate electrical signal and electrical signal adding means to add said electrical signal to said electrical control signal proportional to magnitude of said load to produce a second electrical control signal.

4. A fluid power and control system as set forth in claim 3 wherein said means to generate electrical signal is responsive to computing means.

5. A fluid power and control system as set forth in claim 4 wherein electrical signal blocking means operable to block said second electrical control signal from said control means has means responsive to said computing means.

6. A fluid power and control system as set forth in claim 4 wherein a fluid bypass valve means is interposed between said valve means and said fluid pump, said fluid bypass valve means having means responsive to said computing means.

7. A fluid power and control system as set forth in claim 6 wherein said fluid bypass valve means has pump flow blocking means and fluid replenishing means between said valve means and reservoir means.

8. A fluid power and control system as set forth in claim 7 wherein check valve means interconnect for one way fluid flow said fluid motor and said reservoir means.

9. A fluid power and control system as set forth in claim 3 wherein said means to generate electrical signal is responsive to pump pressure modulating means.

10. A fluid power and control system as set forth in claim 3 wherein said means to generate electrical signal has constant electrical signal generating means.

11. A fluid power and control system as set forth in claim 3 wherein said control means includes a second transducer means having means to convert pump pressure into a proportional third electrical control signal and feedback means to combine said second electrical control signal with said third electrical control signal and to transmit an electrical error signal to third transducer means.

12. A fluid power and control system as set forth in claim 11 wherein said control means includes said third transducer means having means to convert an electrical control signal into pressure signal, fluid control valve means responsive to said pressure signal and operable through said flow changing means to vary flow of said pump to control pressure of said system in response to said electrical error signal.

13. A fluid power and control system as set forth in claim 1 wherein maximum pressure control means has deactivating means of said control means to deactivate said control means when maximum pressure of said fluid power and control system reaches a maximum predetermined pressure level.

14. A fluid power and control system as set forth in claim 1 wherein an electrical signal limiting means limits the maximum level of said control signal proportional to magnitude of said load to a certain predetermined value.

15. A fluid power and control system as set forth in claim 1 wherein minimum electrical signal level generating means is operable to supply a minimum level electrical signal to said control means when said electrical control signal proportional to magnitude of said load drops below minimum signal level as determined by setting of said minimum electrical signal level generating means.

16. A fluid power and control system comprising a fluid pump, a fluid motor driving a load, and valve means interposed between said pump and said motor to control said load, flow changing means operable to vary fluid flow delivered from said pump to said fluid system to vary pressure in said fluid system, first control means having means operable to limit through said flow changing means maximum pressure of said system to a fixed predetermined level, second control means having means operable to limit through said flow changing means minimum pressure of said system to a fixed predetermined level, control signal generating means having means to generate an electrical control signal proportional to magnitude of said load and control means responsive to said electrical control signal having means operable through said flow changing means to control pressure differential between pressure of said fluid system and pressure necessary to support said load.

17. A fluid power and control system comprising a fluid pump, plurality of fluid motors driving loads, and valve means interposed between said pump and each of said motors to control each load, flow changing means operable to vary fluid flow delivered from said pump to said fluid system to vary pressure in said fluid system, control signal generating means having means to generate an electrical control signal proportional to magnitude of each load, each electrical control signal modifying means, electrical control signal phasing means operable to receive all of said modified electrical control signals and to pass only the highest modified electrical control signal from the highest system load, and control means responsive to said highest modified electrical control signal having means operable through said flow changing means to control pressure differential between pressure of said fluid system and pressure necessary to support said highest system load.

18. A fluid power and control system as set forth in claim 17 wherein said control signal generating means includes first transducer means having means to convert a mechanical force signal proportional to said load into a first proportional electrical signal.

19. A fluid power and control system as set forth in claim 17 wherein said electrical control signal modifying means has means to generate electrical signal and electrical signal adding means to add said electrical signal to said electric control signal proportional to magnitude of each load to produce a second electrical controlled signal.

20. A fluid power and control system as set forth in claim 19 wherein said means to generate electrical signal is responsive to computing means.

21. A fluid power and control system as set forth in claim 20 wherein electrical signal blocking means operable to block said second electrical control signal from said control means has means responsive to said computing means.

22. A fluid power and control system as set forth in claim 20 wherein a fluid bypass valve means is interposed between said valve means and said fluid pump, said fluid bypass valve means having means responsive to said computing means.

23. A fluid power and control system as set forth in claim 22 wherein said fluid bypass valve means has pump flow blocking means and fluid replenishing means between said valve means and reservoir means.

24. A fluid power and control system as set forth in claim 23 wherein check valve means interconnect for one way fluid flow said fluid motor and said reservoir means.

25. A fluid power and control system as set forth in claim 19 wherein said means to generate electrical signal is responsive to pump pressure modulating means.

26. A fluid power and control system as set forth in claim 19 wherein said means to generate electrical signal has constant electrical signal generating means.

27. A fluid power and control system as set forth in claim 19 wherein said control means includes a second transducer means having means to convert pump pressure into a proportional third electrical control signal and feedback means to combine highest of said second electrical control signals with said third electrical control signal and to transmit and electrical error signal to a third transducer means.

28. A fluid power and control system as set forth in claim 27 wherein said control means includes said third transducer means having means to convert an electrical control signal into pressure signal, fluid control valve means responsive to said pressure signal and operable through said flow changing means to vary flow of said pump to control pressure of said system in response to said electrical error signal.

29. A fluid power and control system as set forth in claim 17 wherein maximum pressure control means has deactivating means of said control means to deactivate said control means when maximum pressure of said fluid power and control system reaches a maximum predetermined pressure level.

30. A fluid power and control system as set forth in claim 17 wherein an electrical signal limiting means limits the maximum level of said highest modified electrical control signal to a certain predetermined value.

31. A fluid power and control system as set forth in claim 17 wherein minimum electrical signal level generating means is operable to supply a minimum level electrical signal to said control means when said highest modified electrical control signal drops below minimum signal level as determined by setting of said minimum electrical signal level generating means.

32. A fluid power and control system as set forth in claim 1 wherein said means operable through said flow changing means includes converting means to convert said electrical control signal into proportional pressure signal.

33. A fluid power and control system as set forth in claim 16 wherein said means operable through said flow changing means includes converting means to convert said electrical control signal into proportional pressure signal.

34. A fluid power and control system as set forth in claim 17 wherein said means operable through said flow changing means includes converting means to convert said electrical control signal into proportional pressure signal.

35. A fluid power and control system comprising a fluid pump, a fluid motor driving a load, and valve means interposed between said pump and said motor to control said load, flow changing means operable to vary fluid flow delivered from said pump to said fluid system to vary pressure in said fluid system, control signal generating means having means to generate an electrical control signal proportional to magnitude of said load, and control means responsive to said electrical control signal having converting means to convert said electrical control signal into proportional pressure signal and means operable through said flow changing means to control a pressure differential between pressure of said fluid system and pressure necessary to support said load.

* * * * *